313-414.    XR    2,719,879    SR
REFERENCE    SEARCH ROOM
TX6295
Oct. 4, 1955    A. SPRINGER    2,719,879
TELECOMMUNICATION DEVICE
Filed Feb. 16, 1951
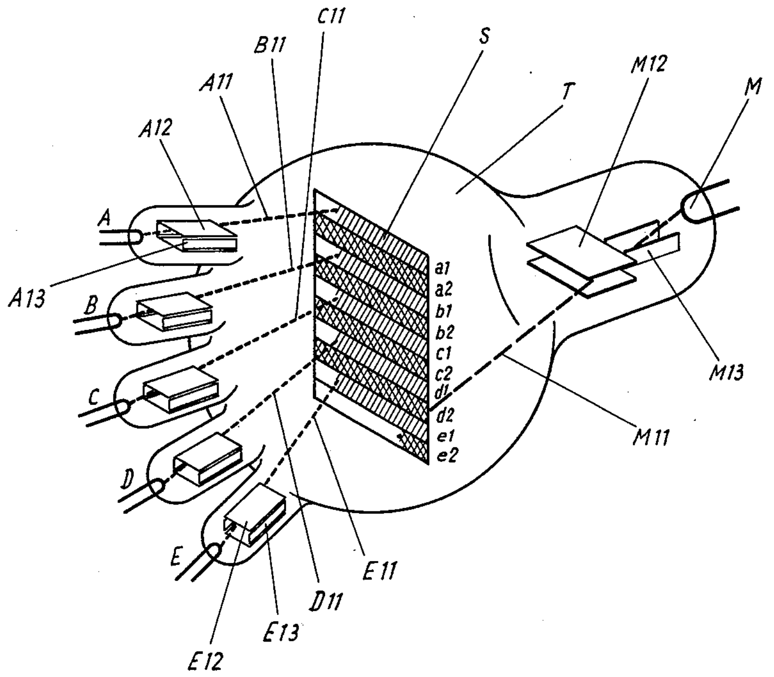
INVENTOR.
ANTON SPRINGER
by Erwin Salzer
ATTORNEY

United States Patent Office 2,719,879

Patented Oct. 4, 1955

2,719,879

TELECOMMUNICATION DEVICE

Anton Springer, Bad Homburg vor der Hohe, Germany, assignor to Telefonbau und Normalzeit Gesellschaft mit beschrankter Haftung, Frankfurt-on-Main, Germany, a joint-stock company of Germany Application February 16, 1951, Serial No. 211,277

Claims priority, application Germany February 20, 1950

4 Claims. (Cl. 179—15)

This invention relates to a method and an apparatus for transmitting intelligence.

In particular this invention relates to simultaneous or contemporaneous transmission of a plurality of interlaced messages through one single communication channel common to said plurality of messages. To this end the messages are being pre-stored and condensed in duration during transmission, resulting in a change of the width of the frequency band involved.

It is the general object of this invention to improve transmission systems for intelligence of the aforementioned kind.

Transmission systems of this kind may include a plurality of electronic recording means arranged at the transmission end and each modulated by one of the plurality of messages intended to be transmitted simultaneously. The aforementioned plurality of electronic recording means includes a common recording or message-storage screen having a plurality of recording areas of which each is simultaneously acted upon by one of a plurality of electron recording beams. Intelligence thus recorded on the aforementioned screen is scanned by one single electron beam at such a velocity as to result in a condensation in time of the intelligence. The signals received at the receiving end of such a transmission system are reconstituted at their original frequency by means of electronic recording means. These recording means include a recording or message-storage screen having a plurality of recording areas and a scanning electron beam for recording the incoming signals successively on said plurality of recording areas. These areas are scanned simultaneously, each by one of a plurality of electron beams. The scanning velocity of the electron beam which is controlled by the incoming signals and the scanning velocity of each of said plurality of electron beams are coordinated in such a way as to reconstitute the messages at their original frequency.

The transmission systems of the aforementioned kind which were known heretofore are subject to serious limitations, resulting from the fact that there must be a phase displacement between the electron beams simultaneously scanning distinct areas on a common screen on the transmitting end and on the receiving end, respectively, of the communication system.

A special object of this invention is to provide a communication method and a communication system of the type under consideration not involving any phase-displacement of the aforementioned kind.

This phase displacement requires relatively complex means for effecting the sweep of the electron beams by which different areas of a common message-storage screen are being scanned. It is, therefore, another special object of this invention to provide a communication method and a communication system of the aforementioned kind involving but simple means for effecting the requisite sweeps of electron beams.

The foregoing and other general and special objects and advantages of the invention will more clearly appear from the ensuing particular description of the invention, as illustrated in the accompanying drawing, showing in diagrammatic fashion an embodiment of the invention.

Within a tube T a screen S is arranged which comprises a two-fold coating adapted to store up electrical values in a form permitting to be picked up afterwards. The message-storing screen S is divided into five fields *a*, *b*, *c*, *d* and *e*. Each field has two lines *a*1 and *a*2; *b*1 and *b*2; and so on. Five electronic systems A, B, C, D and E are provided emitting five cathode ray-beams A11, B11, C11, D11 and E11. The cathode ray-beam A11 is deflected by the plates A12 and A13 in known manner and in such a way as to sweep over or scan sequentially lines *a*1 and *a*2 of field *a* on screen S. In the same way the electron beam B11 sweeps over or scans sequentially lines *b*1 and *b*2 of field *b*; the electron beam C11 sweeps over or scans sequentially lines *c*1 and *c*2 and so on. All electron beams A11, B11, C11, D11 and E11 are deflected synchronously, so as to always sweep over lines of different fields of the common screen S whose reference letters bear the same index numeral. In the drawing it is indicated diagonal hatching of lines *a*1, *b*1, *c*1, *d*1 and *e*1 indicates that at the moment illustrated each of the five beams A11, B11, C11, D11 and E11 has swept over four fifths of the lines whose reference letters bear the index number one, only the last fifth of each line remaining to be swept over or scanned.

Another electronic system M emits an electron beam M11. The beam M11 is controlled by plates M12 and M13 in such a manner that it sweeps over or scans sequentially lines of different fields on screen S whose reference letters have the same index numeral jumping over lines lying between them whose reference letters have different index numerals. The cross-hatching of lines *a*2, *b*2, *c*2 and *d*2 indicates in the drawing that the beam M11 has swept over these lines and that it begins sweeping over line *e*2 of the fifth field *e*. When the sweeping of line *e*2 is finished the electron beam M11 is switched over to the beginning of line *a*1 in order to sweep over the lines of all fields whose reference letters bear the index numeral one thereby jumping over all lines whose reference letters have the index number two.

The electron beam M11 has five times the velocity of beams A11, B11, C11, D11 and E11. Therefore beam M11 sweeps sequentially over the lines *a*2, *b*2, *c*2, *d*2 and *e*2 of the five fields of the screen S in the same interval of time in which each of the beams A11, B11, C11, D11 and E11 sweeps over one of the lines *a*1, *b*1, *c*1, *d*1 and *e*1.

At the transmitting stations of a telecommunication system the five electronic systems A, B, C, D and E are connected to five transmitting paths over which five communications are transmitted simultaneously. The momentary values of these communications are stored in the lines on the screen S when these lines are swept by the electron beams A11, B11, C11, D11 and E11. The lines of the five fields of screen S are thus storing momentary values of five communications. The electronic system M is connected to a transmitting device of a communication channel. Since the velocity of beam M11 when sweeping over the lines of the screen S and picking up from these lines, the frequencies of the five communications stored thereon is five times the velocity of beams A11, B11 . . . etc., the frequencies of the five communications are multiplied by five. Thus the five communications are transmitted over the communication channel with five times higher frequencies and in interlaced relationship to each other.

At the receiving station on the other end of the communication channel the electronic system M is controlled by frequencies received over said communication channel. The electron beam M11 of the device at the receiving station works in synchronism with the electron beam M11 of the device at the transmitting station. The high frequencies received over the common communication channel are distributed by the beam M11 to lines of different fields of the screen of the device at the receiving station whose reference letters have the same index numeral and are stored on said lines of said screen. The lines of the different fields whose reference letters have the same index number are swept simultaneously by the beams A11, B11, C11, D11 and E11 of the electronic systems A–E, the beams A11–E11 moving thereby with a fifth of the velocity of the beam M11. The electronic systems control in known manner five transmitting paths according to the electrical values picked-up by the beams. The receiving stations connected to said transmitting paths receive the communications at the same frequencies as originally transmitted to the transmitting station at the other end of the common communication channel, i. e. the messages transmitted are reconstituted at their original frequency at the receiving end of the channel.

A common control device may be provided at each station controlling simultaneously the plates A12, A13; B12, B13 . . . E12, E13 of the five electronic systems A–E. The common control device may be designed similar to devices which are being used in television. By the common control the five beams of the electronic systems A–E are positively caused to move in synchronism.

The invention is obviously not limited to the use of five electronic systems and to the division of the screen into five fields. The number of divisions of screen S depends upon the limitations which prevail with regard to the arrangement of a plurality of electronic systems within a tube. Nor is the invention limited to the division of each field of the common screen into two lines. Three or more lines may be provided within each field of the common screen.

It will be apparent from the foregoing that during transmission the message-storage screen S is being scanned by a plurality of electron beams A11, B11, C11, D11, E11 each modulated by one of a plurality of messages. Each of said plurality of electron beams A11, B11, C11, D11, E11 moves simultaneously at the same scanning velocity along spaced lines *a*1, *b*1, *c*1, *d*1, *e*1 forming a spaced line group. Screen S is being scanned by beams A11, B11, C11, D11, E11 along spaced lines of alternate spaced line groups as spaced line group *a*1, *b*1, *c*1, *d*1, *e*1 and spaced line group *a*2, *b*2, *c*2, *d*2, *e*2. The lines in each of one of said two spaced line groups are arranged in the spaces formed between the lines of the other said spaced line groups.

Screen S is also being scanned by the additional electron beam M11 moving at a predetermined scanning velocity sequentially along spaced lines forming said spaced lines groups as, for instance, group *a*1, *b*1, *c*1, *d*1, *e*1 or group *a*2, *b*2, *c*2, *d*2, *e*2. Beam M11 scans screen S along spaced lines of alternate said spaced line groups, i. e. beam M11 scans alternately group *a*1, *b*1, *c*1, *d*1, *e*1 and group *a*2, *b*2, *c*2, *d*2, *e*2.

The scanning velocity of beams A11, B11, C11, D11, E11 and the scanning velocity of beam M11 are so correlated that scanning of one said spaced line group is effected by beams A11, B11, C11, D11, E11—for instance of spaced line group *a*1, *b*1, *c*1, *d*1, *e*1—while beam M11 effects scanning of the lines forming another of said spaced line groups—for instance spaced line group *a*2, *b*2, *c*2, *d*2, *e*2.

The same arrangement is used both at the transmitting end and at the receiving end of the communication channel. Reconstituting the plurality of messages condensed in duration during transmission thereof comprises the following steps.

The message-storage screen S is being scanned by the electron beam M11 modulated by a plurality of interlaced messages by moving the beam at a predetermined scanning velocity sequentially along spaced lines forming a spaced line group as, for instance, spaced line group *a*2, *b*2, *c*2, *d*2, *e*2. Beam M11 scans alternately spaced line groups, as group *a*2, *b*2, *c*2, *d*2, *e*2 and *a*1, *b*1, *c*1, *d*1, *e*1. Screens S is also scanned by electron beams A11, B11, C11, D11, E11 which move simultaneously at the same scanning velocity along spaced lines in one of said spaced line groups, e. g. group *a*1, *b*1, *c*1, *d*1, *e*1. The beams A11, B11, C11, D11, E11 scan screen S along spaced lines of alternate spaced line groups, such as group *a*1, *b*1, *c*1, *d*1, *e*1, or group *a*2, *b*2, *c*2, *d*2, *e*2. While screen S is being scanned in the aforestated manner such a correlation between the scanning velocity of beam M11 and the scanning velocity of beams A11, B11, C11, D11, E11 is being maintained that scanning of the spaced lines in one said spaced line group—e. g. group *a*2, *b*2, *c*2, *d*2, *e*2—is effected by beam M11 while beams A11, B11, C11, D11, E11 scan all of the lines in another of said spaced line groups.

It will be understood that I have illustrated and described herein a preferred embodiment of the invention and that various alterations may be made in the details thereof and in the electronic tube system in conjunction with which they are illustrated, without departing from the spirit and scope of the invention as defined in the appended claims.

I claim:

1. The method of storing a plurality of messages on a message storing screen by a plurality of electron beams each modulated by one of said plurality of messages and of condensing the duration of said messages for transmission through one single common transmission channel comprising the steps of scanning said screen by each of said plurality of beams at the same velocity simultaneously along one line in each of a plurality of identical groups of spaced contiguous lines and of scanning said screen thereafter by each of said plurality of beams at said same velocity simultaneously along another line in each of said plurality of groups; of scanning said screen by an additional electron beam at a predetermined velocity sequentially along one line in each of said plurality of groups and of scanning said screen thereafter by said additional beam at said predetermined velocity sequentially along another line in each of said plurality of groups; of maintaining said same velocity and said predetermined velocity so correlated as to cause the total time required by said additional beam for scanning one line in each of said plurality of groups to be within the time required by each of said plurality of beams for scanning one single line in any of said plurality of groups; and of maintaining said additional beam displaced with respect to each of said plurality of beams to cause scanning by said additional beam of lines previously scanned by said plurality of beams.

2. The method of storing messages on a message storing screen by $n$ electron beams each modulated by one of $n$ messages and of condensing the duration of said messages for transmission through one single common transmission channel comprising the steps of scanning said screen by each of said $n$ beams sequentially along the lines pertaining to one out of $n$ identical families of spaced contiguous lines and of scanning said screen by each of said $n$ beams simultaneously along corresponding lines in each of said $n$ families while maintaining the scanning velocity of each said $n$ beams at a predetermined value $v_1$; said method further comprising the steps of scanning said screen by an additional electron beam sequentially along corresponding lines in said $n$ families and sequentially along all the lines in said $n$ families while maintaining the scanning velocity of said additional beam at a predetermined value equal to or larger than the product of said number $n$ and said predetermined value $v_1$ of scanning velocity, and of maintaining a displacement between each of said $n$ beams and said additional beam to cause scanning by said additional beam of lines previously scanned by said $n$ beams.

3. The method of reconstituting by means of a message storing screen a plurality of interlaced messages condensed in duration for transmission through a common communication channel comprising the steps of scanning said screen by an electron beam modulated by said plurality of messages at a predetermined scanning velocity sequentially along one line in each of a plurality of identical groups of spaced contiguous lines, and of scanning said screen thereafter by said beam at said predetermined scanning velocity sequentially along another line in each of said plurality of groups; of scanning said screen by each of a plurality of additional electron beams at the same scanning velocity simultaneously along one line in each said plurality of groups and of scanning said screen thereafter by each of said plurality of beams at said same scanning velocity simultaneously along another line in each said plurality of groups; of maintaining said same scanning velocity and said predetermined scanning velocity so correlated as to cause the time required by each of said plurality of beams for scanning one single line in any of said plurality of groups to be within the total time required by said beam for scanning one line in each of said plurality of groups, and of maintaining said beam displaced with respect to each of said plurality of beams to cause scanning by each of said plurality of beams of lines previously scanned by said beam.

4. The method of reconstituting by means of a message storing screen $n$ interlaced messages condensed in duration for transmission through a common communication channel comprising the steps of scanning said screen by an electron beam modulated by said $n$ messages sequentially along corresponding lines in $n$ identical families of spaced contiguous lines and of scanning said screen by said beam sequentially along all the lines in said families while maintaining the scanning velocity of said beam at a predetermined value $v_2$; of scanning said screen by each of $n$ additional electron beams sequentially along the lines in one family out of said $n$ families and of scanning said screen by each of said $n$ beams simultaneously along corresponding lines in each of said $n$ families while maintaining the scanning velocity of said $n$ additional beams at a predetermined value equal to or smaller than said predetermined value $v_2$ of scanning velocity divided by said number $n$; and of maintaining said beam displaced with respect to said $n$ additional beams to cause scanning by said $n$ additional beams of lines previously scanned by said beam.

References Cited in the file of this patent

UNITED STATES PATENTS

| | | |
|---|---|---|
| 2,277,516 | Henroteau | Mar. 24, 1942 |
| 2,367,277 | Henroteau | Jan. 16, 1945 |

FOREIGN PATENTS

| | | |
|---|---|---|
| 475,239 | Great Britain | Nov. 16, 1937 |
| 928,783 | France | June 16, 1947 |